US008872921B2

(12) United States Patent
Ge

(10) Patent No.: US 8,872,921 B2
(45) Date of Patent: Oct. 28, 2014

(54) VEHICLE REARVIEW BACK-UP SYSTEM AND METHOD

(75) Inventor: Chi-Sheng Ge, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 224 days.

(21) Appl. No.: 13/299,064

(22) Filed: Nov. 17, 2011

(65) Prior Publication Data

US 2012/0133766 A1 May 31, 2012

(30) Foreign Application Priority Data

Nov. 26, 2010 (TW) .............................. 99140884 A

(51) Int. Cl.
*H04N 7/18* (2006.01)
*B62D 15/02* (2006.01)
*B60R 1/00* (2006.01)
*G06F 19/00* (2011.01)

(52) U.S. Cl.
CPC .............. *B60R 1/00* (2013.01); *B62D 15/0295* (2013.01); *B60R 2300/806* (2013.01)
USPC ............................................ 348/148; 348/36

(58) Field of Classification Search
USPC .......................... 348/240.99; 342/53; 701/36
See application file for complete search history.

(56) References Cited

U.S. PATENT DOCUMENTS

| | | | | |
|---|---|---|---|---|
| 7,117,073 B2 * | 10/2006 | Endo et al. | ...................... | 701/28 |
| 7,232,064 B1 * | 6/2007 | Toohey | ........................ | 235/384 |
| 8,233,045 B2 * | 7/2012 | Luo et al. | ....................... | 348/148 |
| 8,339,253 B2 * | 12/2012 | Chundrlik et al. | ............. | 340/436 |
| 2005/0012833 A1 * | 1/2005 | Yokota et al. | ............. | 348/240.99 |
| 2005/0043871 A1 * | 2/2005 | Endo et al. | ....................... | 701/36 |
| 2008/0150786 A1 * | 6/2008 | Breed | .............................. | 342/53 |
| 2009/0254260 A1 * | 10/2009 | Nix et al. | ......................... | 701/96 |
| 2011/0133957 A1 * | 6/2011 | Harbach et al. | ............. | 340/932.2 |
| 2011/0228985 A1 * | 9/2011 | Uchida et al. | ................. | 382/103 |
| 2012/0056758 A1 * | 3/2012 | Kuhlman et al. | ........... | 340/932.2 |
| 2012/0105635 A1 * | 5/2012 | Erhardt et al. | ................ | 348/148 |
| 2012/0287276 A1 * | 11/2012 | Dwivedi et al. | ............... | 348/148 |
| 2013/0002873 A1 * | 1/2013 | Hess | ............................. | 348/148 |
| 2014/0036078 A1 * | 2/2014 | Nerayoff et al. | .............. | 348/148 |
| 2014/0039987 A1 * | 2/2014 | Nerayoff et al. | ................ | 705/13 |

* cited by examiner

*Primary Examiner* — Sath V Perungavoor
*Assistant Examiner* — Howard D Brown, Jr.
(74) *Attorney, Agent, or Firm* — Novak Druce Connolly Bove + Quigg LLP

(57) ABSTRACT

A vehicle rearview back-up system includes a backup camera, a display, a calculator, a storage unit, a detector, and a moving unit. The backup camera captures an image of a parking spot when the vehicle is backed-up to a predetermined position. The display displays the captured image and an outlined parking spot in the captured image defined by the driver. The calculator calculates an imaging ratio between the size of the captured image and the size of the outlined parking spot. The display displays a vehicle image in a predetermined region according to the calculated imaging ratio. The detector detects moving direction and moving distance of the vehicle. The moving unit moves the vehicle image in the display according to the moving direction and moving distance of the vehicle, and the calculated imaging ratio for implementing the back-up process of the vehicle.

13 Claims, 3 Drawing Sheets

VEHICLE REARVIEW BACK-UP SYSTEM AND METHOD

BACKGROUND

1. Technical Field

The present disclosure relates to vehicles, and in particular, relates to a vehicle with a rearview back-up system.

2. Description of Related Art

Often drivers must back-up or reverse their cars when parking or leaving a parking spot. Back-up or reversing cameras are often disposed at the rear of the cars for providing a view of what is behind the car. However, images provided by such cameras may not clearly reveal to drivers the nature and distance of obstacles they are approaching when backing up, which means accidents can still happen.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
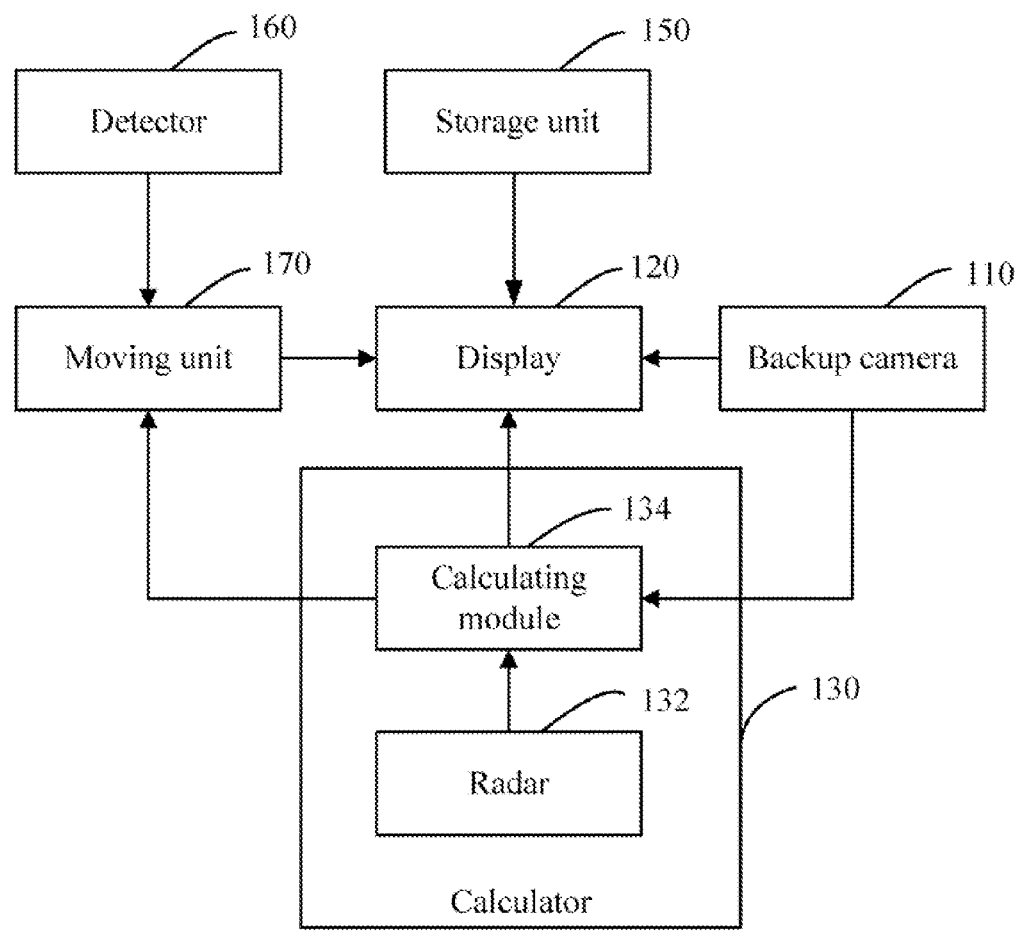
FIG. 1 is a block diagram of a vehicle rearview back-up system of a vehicle according to an embodiment of the present disclosure.
Figure 2:
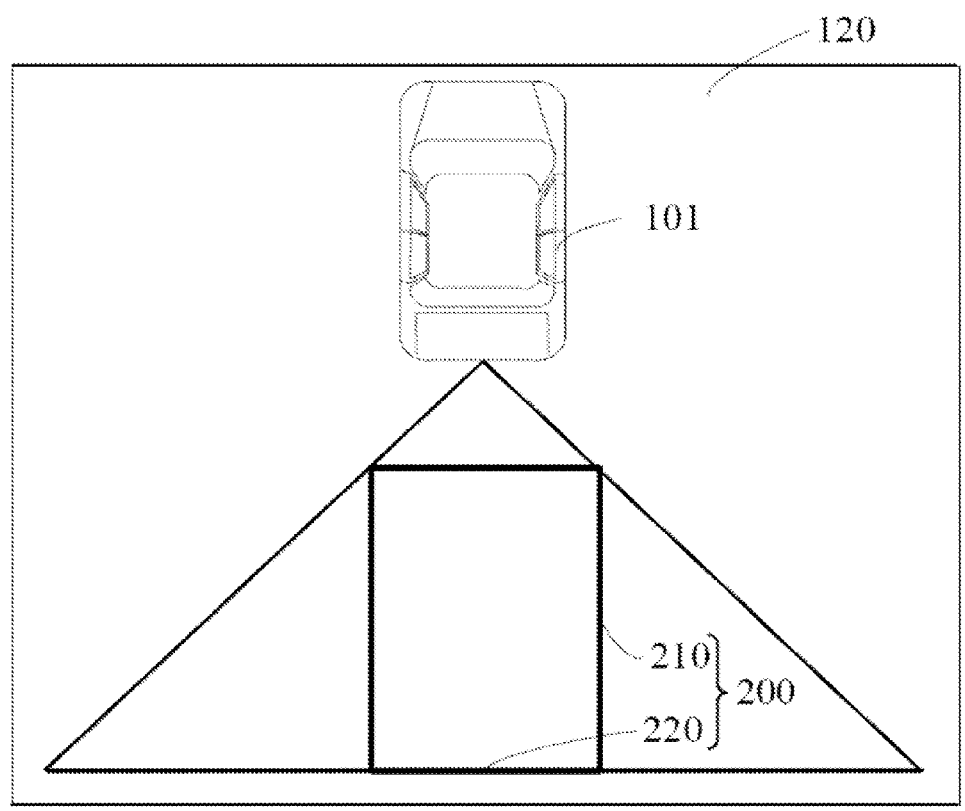
FIG. 2 is a schematic view showing the back-up process of the vehicle of FIG. 1.

Referring to FIG. 1 and FIG. 2, a vehicle rearview back-up system 100 of a vehicle (not labeled) is provided. The vehicle rearview back-up system 100 is used for providing a rear view for a driver. For example, in some embodiments, the system 100 is used for assisting the driver in backing into a parking spot. The system 100 includes a backup camera 110, a display 120, a calculator 130, a storage unit 150, a detector 160, and a moving unit 170. The system 100 is able to implement a parking process in real time as further described below.

The backup camera 110 is used for capturing images of the parking spot in which the vehicle is to be parked when the vehicle is backed-up to a predetermined position and thus obtaining an image of the parking spot. When the driver of the vehicle judges the camera 110 has a clear view of the parking spot the driver initiates the parking process, and the backup camera 110 captures the image of the parking spot.

The display 120 in an embodiment is a touch sensitive display. The display 120 displays the captured image of the parking spot 200. The driver can touch the display 120 using a finger or stylus to roughly outline the parking spot on the captured image of the parking spot 200 and thus obtain an outlined parking spot 210 on the captured image of the parking spot 200. The captured image of the parking spot 200 in the embodiment further include a view of at least one obstacle 220 located at a back of the outlined parking space 210. In the illustrated embodiment, the display 120 is a screen arranged near the steering wheel of the vehicle for being conveniently observed and touched.

The calculator 130 is used for calculating the imaging ratio between a size of the captured image of the parking spot 200 and a size of the outlined parking spot 210. The calculator 130 includes a radar 132 and a calculating module 134. The radar 132 is disposed at the rear of the vehicle and is arranged on the same horizontal level as the backup camera 110. The radar 132 is used for detecting the distance between the rear of the vehicle and the obstacle 220. The radar 132 is further used for calculating a subject distance U of the captured image of the parking spot 200. The calculating module 134 is electrically connected to the backup camera 110 and the radar 132, and is used for obtaining a focal length F of the captured image of the parking spot 200, and calculating a viewing distance V of the captured image of the parking spot 200 according to the distance U and the focal length F, and further calculating the size of the captured image of the parking spot 200 according to the viewing distance V and the subject distance U. The size of the outlined parking spot 210 can be calculated by any known technology.

The storage unit 150 is used for storing a vehicle image 101.

The display 120 is also used for displaying the vehicle image 101 and the outlined parking spot 210 simultaneously on the captured image of the parking spot 200 in the display 120 according to the calculated imaging ratio and where the vehicle is actually located relative to the outlined parking spot 210.

The detector 160 is used for detecting the moving distance and moving direction of the vehicle. In some embodiments, the detector 160 may be gyroscopes or three-scale acceleration semiconductors.

The moving unit 170 is used for updating the overlay position of the image 101 in the display 120 according to the detected moving distance, the detected moving direction, and the calculated imaging ratio. As such, the driver can view the back-up process clearly and correctly, and steer the vehicle into the parking spot.

Figure 3:
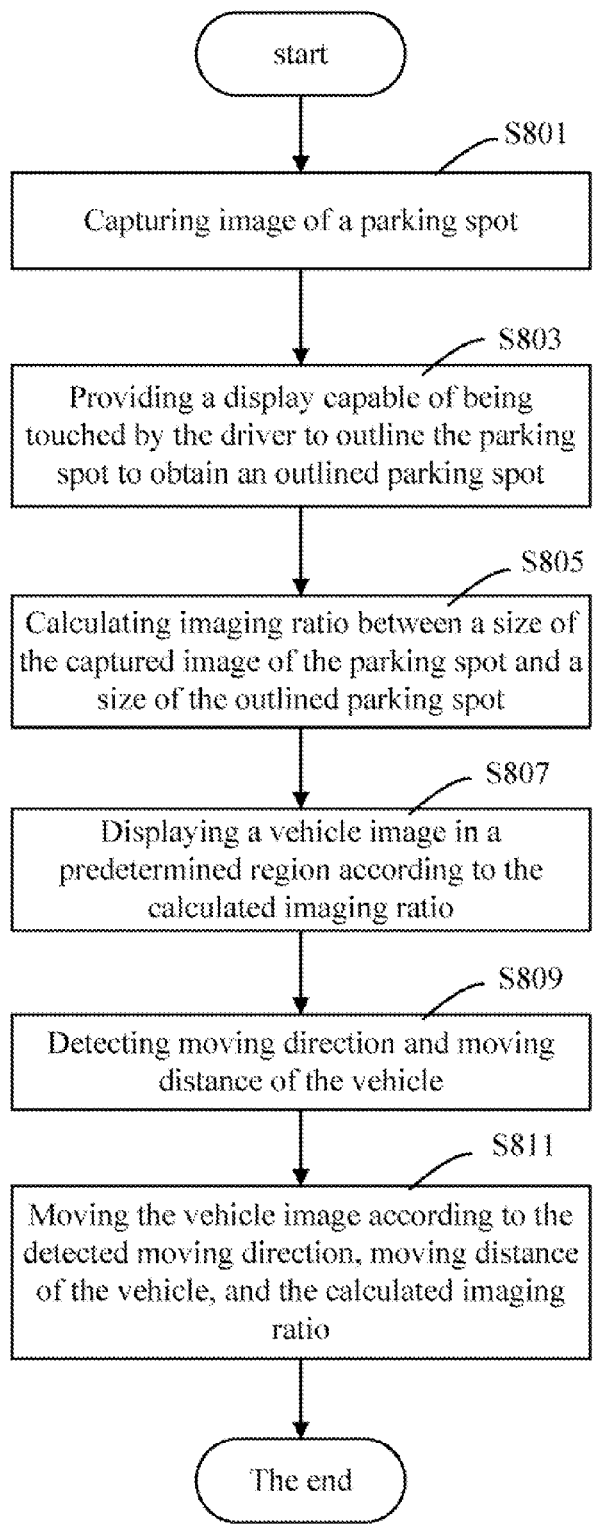
FIG. 3 is a flow chart of a vehicle rearview back-up method of the vehicle of FIG. 1.

Referring to FIG. 3, a vehicle rearview back-up method is provided for providing a rear view for a driver. In an embodiment, the vehicle rearview back-up method is used for providing a rear view for the driver so that the driver can backup the vehicle to a parking spot easily. The vehicle rearview back-up method including the following steps:

In step S801, the backup camera 110 captures an image of the parking spot in which the vehicle is to be parked when the vehicle is backed-up to a predetermined position. When the driver of the vehicle judges the backup camera 110 has a clear view of the parking spot the driver initiates the parking process, and the backup camera 110 captures the image of the parking spot.

In the illustrated embodiment, the display 120 is a touch sensitive display which allows the driver to roughly outline the captured image of the parking spot 200 and thus obtaining the outlined parking spot 210. The captured image of the parking spot 200 further includes at least one obstacle 220 located near the back boundary of the outlined parking space 210.

In step S805, the calculator 130 calculates the imaging ratio between a size of the captured image of the parking spot 200 and a size of the outlined parking spot 210. In the illustrated embodiment, the calculator 130 includes a radar 132 and a calculating module 134. The radar 132 is disposed at the rear of the vehicle for detecting the distance between the rear of the vehicle and the obstacle and further calculating a subject distance U of the captured image of the parking spot 200 according to the detected distance. The calculating module 134 is used for calculating a viewing distance V according to the subject distance U and a focal length F of the captured image of the parking spot 200, and further calculating the size of the captured image of the parking spot 200 according to the calculated subject distance U and viewing distance V.

In step S807, the display 120 displays a vehicle image 101 and the outlined parking spot 210 simultaneously on the captured image of the parking spot 200, the vehicle image 100 is positioned in a predetermined region of the display 120 according to the imaging ratio. In some embodiments, the predetermined region is obtained by the system 100 according to the predetermined position where the vehicle is located when the image of the parking spot is captured. In other embodiments, the predetermined region may be the current location of the vehicle input by the users.

In step S809, the detector 160 detects the moving distance and moving direction of the vehicle.

In step S811, the moving unit 170 moves the image 101 in the display 110 according to the detected moving distance, the detected moving direction of the vehicle, and the calculated imaging ratio, as such, the back-up process of the vehicle is implemented and shown in the display 120.

It is to be understood, however, that even though information and the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A vehicle rearview back-up system for providing a rear view for a driver, the vehicle rearview back-up system comprising:
   a backup camera disposed at a rear of the vehicle for capturing an image of a parking spot in which the vehicle is to be parked when the vehicle is backed-up to a predetermined position;
   a display capable of being touched by the driver to outline the parking spot on the captured image of the parking spot to obtain an outlined parking spot;
   a calculator for calculating an imaging ratio between a size of the captured image of the parking spot and a size of the outlined parking spot;
   a storage unit for storing a vehicle image;
   the display further simultaneously displaying the vehicle image and the outlined parking spot on the captured image of the parking spot according to the calculated imaging ratio;
   a detector for detecting moving direction and moving distance of the vehicle; and
   a moving unit for moving the vehicle image in the the captured image of the parking spot according to the detected moving direction and moving distance of the vehicle, and the calculated imaging ratio for implementing the back-up process of the vehicle.

2. The vehicle rearview back-up system as claimed in claim 1, wherein the outlined parking spot includes a view of the parking space and at least one obstacle located at a back boundary of the parking space.

3. The vehicle rearview back-up system as claimed in claim 1, wherein the calculator comprises a radar and a calculating module, the radar is arranged at the rear of the vehicle for calculating a subject distance of the captured image of the parking spot, the calculating module is used for calculating a view distance of the captured image of the parking spot, and calculating the size of the captured image of the parking spot according to the subject distance and view distance.

4. The vehicle as claimed in claim 3, wherein the radar detects the distance between the rear of the vehicle and the obstacle and further calculates the subject distance according to the detected distance; and the calculating module calculates the view distance according to the subject distance and a focal length of the captured image of the parking spot.

5. The vehicle rearview back-up system as claimed in claim 3, wherein the backup camera and the radar are disposed on the same horizontal level at the rear of the vehicle.

6. The vehicle rearview back-up system as claimed in claim 3, wherein the backup camera is closest to the obstacle in the predetermined position and captures the image of the whole parking spot.

7. The vehicle rearview back-up system as claimed in claim 1, wherein the predetermined region is obtained according to the current location of the vehicle input by the driver.

8. The vehicle rearview back-up system of claimed in claim 1, wherein the predetermined region is obtained according to the predetermined position where the backup camera captures the image of the parking spot.

9. A vehicle rearview back-up method for providing a rear view for a driver, the method comprising the following steps:
   capturing an image of the parking spot when the vehicle is backed-up to a predetermined position;
   providing a display capable of being touched by the driver to outline the parking spot on the captured image of the parking spot to obtain an outlined parking spot;
   calculating an imaging ratio between a size of the captured image of the parking spot and a size of the outlined parking spot;
   displaying a vehicle image and the outlined parking spot on the captured image of the parking spot simultaneously according to the calculated imaging ratio;
   detecting the moving distance and the moving direction of the vehicle; and
   moving the vehicle image in the captured image of the parking spot according to the imaging ratio, the detected moving distance, and the detected moving direction to implement the back-up process of the vehicle.

10. The vehicle rearview back-up method as claimed in claim 9, wherein the outlined parking spot comprises a view of the parking space and at least one obstacle located at a back boundary of the parking space.

11. The vehicle rearview back-up method as claimed in claim 10, wherein the step of calculating the imaging ratio between the size of the captured image of the parking spot and the size of the outlined parking spot comprises the steps of:
   detecting the distance between the vehicle and the at least one obstacle when the vehicle is located at the predetermined position;
   calculating a subject distance of the captured image of the parking spot according to the distance between the rear of the vehicle and the obstacle;
   obtaining a focal length of the captured image of the parking spot and calculating a view distance according to the subject distance and the focal length; and
   calculating the size of the captured image of the parking spot according to the subject distance and the view distance.

12. The vehicle rearview back-up method as claimed in claim 9, wherein the predetermined region is determined according to the current location of the vehicle input by users.

13. The vehicle rearview back-up method as claimed in claim 9, wherein the predetermined region is determined according to the predetermined position.

* * * * *